United States Patent
Barkarö

[11] Patent Number: 5,949,224
[45] Date of Patent: Sep. 7, 1999

[54] BUCK BOOST SWITCHING REGULATOR

[75] Inventor: Stefan Barkarö, Solna, Sweden

[73] Assignee: Telefonaktiebolaget LM Ericsson, Stockholm, Sweden

[21] Appl. No.: 09/129,621

[22] Filed: Aug. 5, 1998

[30] Foreign Application Priority Data

Aug. 6, 1997 [SE] Sweden .................................. 9702870

[51] Int. Cl.⁶ .................................................. G05F 1/563
[52] U.S. Cl. .......................... 323/282; 323/351; 363/101
[58] Field of Search ................................. 323/271, 280, 323/273, 274, 282, 284, 350, 351, 222, 344; 363/101

[56] References Cited

U.S. PATENT DOCUMENTS

| | | | |
|---|---|---|---|
| 4,245,286 | 1/1981 | Paulkovich et al. ....................... | 363/21 |
| 4,395,675 | 7/1983 | Toymani .................................. | 323/271 |
| 4,578,630 | 3/1986 | Grosh ...................................... | 323/271 |
| 4,692,686 | 9/1987 | Thomas .................................... | 323/263 |
| 4,716,357 | 12/1987 | Cooper .................................... | 323/263 |
| 4,733,104 | 3/1988 | Steigerwald et al. .................... | 327/176 |
| 4,736,151 | 4/1988 | Dishner ................................... | 323/224 |
| 4,801,854 | 1/1989 | Dishner ................................... | 323/224 |
| 5,402,060 | 3/1995 | Erisman .................................. | 323/268 |
| 5,528,125 | 6/1996 | Marshall et al. ......................... | 323/222 |
| 5,602,463 | 2/1997 | Bendall et al. .......................... | 323/266 |
| 5,714,863 | 2/1998 | Hwang et al. ........................... | 320/166 |
| 5,847,554 | 12/1998 | Wilcox et al. .......................... | 323/282 |

*Primary Examiner*—Adolf Deneke Berhane
*Attorney, Agent, or Firm*—Burns, Doane, Swecker & Mathis, L.L.P.

[57] ABSTRACT

A buck boost switching regulator includes a buck switch and a boost switch controlled by a first and second comparator, respectively. The first comparator generates a duty cycle control signal for the buck switch in response to the difference between the regulator output voltage and a control voltage corresponding to a desired regulator output voltage. The second comparator generates a duty cycle control signal for the boost switch in response to a supply voltage.

3 Claims, 1 Drawing Sheet

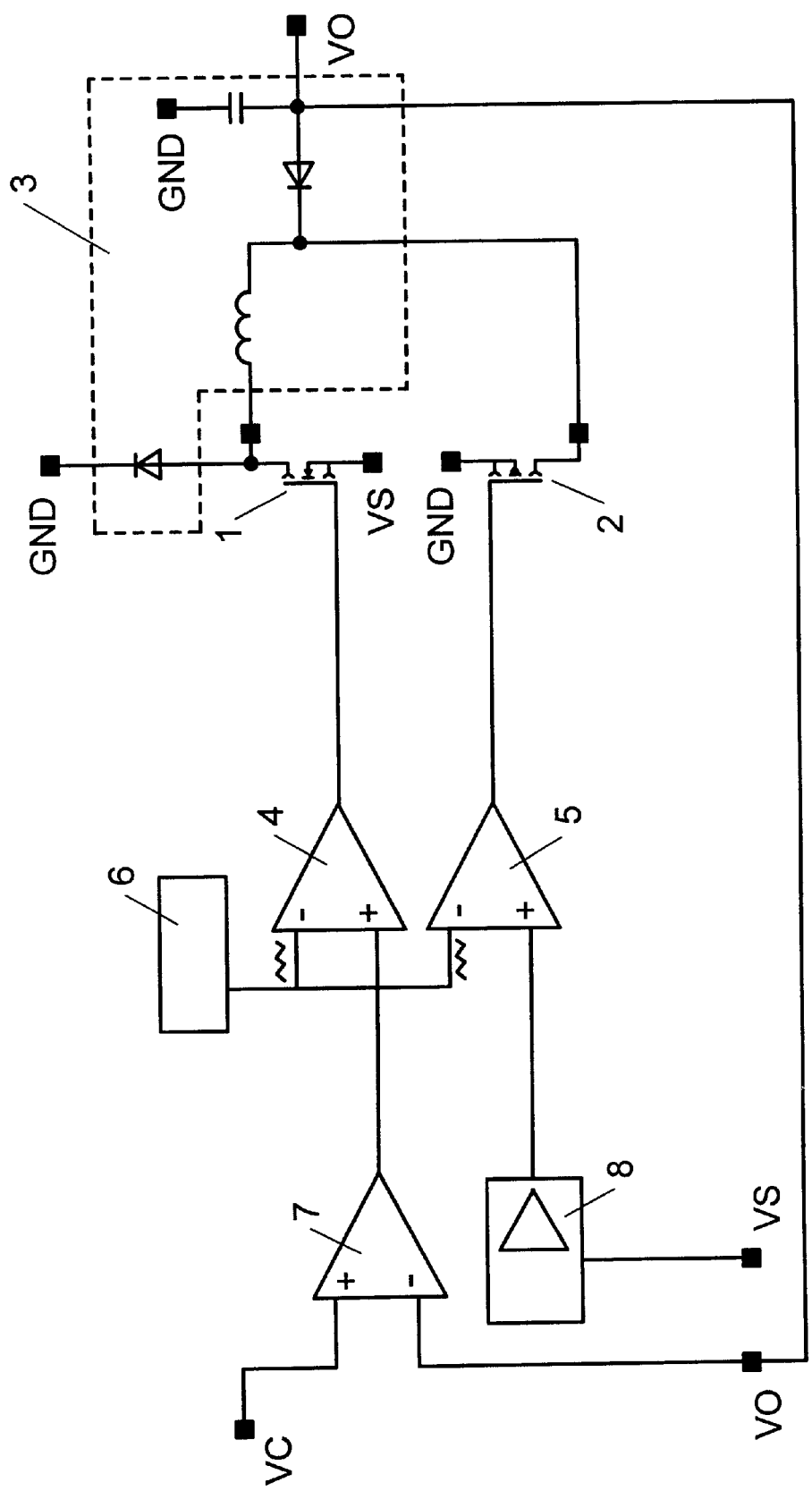
FIGURE

BUCK BOOST SWITCHING REGULATOR

TECHNICAL FIELD

The invention relates generally to voltage regulators and more specifically to a buck boost switching regulator.

BACKGROUND

In e.g. line interface board applications, supply voltages are generated to subscriber line interface circuits on line interface boards. These supply voltages are generated by means of DC/DC converters from a DC supply voltage, normally −48V. The voltages that have to be generated by those DC/DC converters are normally between −20V and −120V depending on the application.

If voltages are to be generated between ground and the DC supply voltage, a so called buck regulator is suitably used. For voltages below the DC supply voltage, a so called boost regulator is used.

In some applications, voltages above as well as below the supply voltage are to be generated by means of the same regulator. In such cases, a combined buck boost switching regulator is needed.

An example of a known buck boost switching regulator is disclosed in U.S. Pat. No. 4,578,630.

That known buck boost switching regulator has two control loops which may cause stability problems. Moreover, suppression of disturbances in the form of AC components on the DC supply voltage is poor in the known regulator. Thus, the known regulator would be unsuitable for use in e.g. line interface board applications.

SUMMARY

The object of the invention is to bring about a buck boost switching regulator which can generate output voltages above as well as below a DC supply voltage without the above problems.

This is attained in accordance with the invention mainly in that the duty cycle of the boost switch is controlled by the DC supply voltage and not by the output voltage of the switching regulator.

To stabilize the regulator, it will, thus, be necessary to compensate only the buck switch loop. Also, a good suppression of disturbances on the DC supply voltage will be obtained.

BRIEF DESCRIPTION OF THE DRAWING

The invention will be described more in detail below with reference to the appended drawing, on which the single FIGURE shows an embodiment of a buck boost switching regulator in accordance with the invention.

DETAILED DESCRIPTION

The single FIGURE shows an embodiment of a buck boost switching regulator in accordance with the invention, comprising a buck or ground switch 1 and a boost or battery switch 2. Both switches 1 and 2 are shown as DMOS transistors, but it is to be understood that other types of switches may equally well be used.

The drains of the transistors 1 and 2 are connected to respective inputs of a filter 3 whose outputs form the output terminals VO and GND of the switching regulator.

The sources of the transistors 1 and 2 are connected to a supply voltage terminal VS and a ground terminal GND, respectively. The DC level of the DC supply voltage applied to the terminal VS can vary and AC disturbances can appear on the DC supply voltage.

The gates of the transistors 1 and 2, i.e. the duty cycle control input terminals of the transistors 1 and 2, are connected to the output of comparators 4 and 5, respectively.

The comparator 4 is adapted to generate a duty cycle control output signal to control the duty cycle of the transistor 1. To this end, one input of the comparator 4 is connected to the output of a ramp generator 6 which is adapted to generate a recurrent ramp signal, while the other input of the comparator 4 is connected to the output of an amplifier 7. One input of the amplifier 7 is connected to the output terminal VO of the switching regulator, while its other input is connected to a control voltage terminal VC for receiving a control voltage corresponding to the desired regulator output voltage. The control voltage terminal VC may e.g. be connected to a subscriber line interface circuit requesting the switching regulator to supply a desired voltage to it via the output terminal VO.

The comparator 5 is adapted to generate a duty cycle control output signal to control the duty cycle of the transistor 2. To this end, one input of the comparator 5 is connected to the output of the ramp generator 6, while the other input of the comparator 5 is connected to the output of an amplifier 8 which is adapted to amplify the supply voltage, applied to the terminal VS, to a desired level.

In accordance with the invention, the gain of the amplifier 8 is set to such a value that the regulator output voltage on the terminal VO equals the most negative output voltage that is to be generated with the buck switch, i.e. the transistor 1, off.

Since the boost switch, i.e. the transistor 2, is not part of any feedback loop, no stability problems arise. The stability of the regulator is ensured simply by means of compensation circuitry (not shown) in the buck switch loop.

Moreover, since the duty cycle of the boost switch 2 is controlled upon a change of the DC supply voltage applied to the terminal VS, the rejection of disturbances on the DC supply voltage will be high. In view of the fact that the DC supply voltage can be quite unsteady, this is a big advantage compared to buck boost switching regulators known so far.

What is claimed is:

1. A buck boost switching regulator comprising a buck switch and a boost switch, each having a duty cycle control input terminal connected to the output of a first and second comparator, respectively, the first comparator being adapted to generate a buck switch duty cycle control output signal in response to the difference between the regulator output voltage and a control voltage corresponding to a desired regulator output voltage, the second comparator being adapted to generate a boost switch duty cycle control output signal in response to a supply voltage.

2. The regulator as claimed in claim 1, wherein one input of both the first and the second comparator is connected to the output of a ramp generator for generating a recurrent ramp signal, that the other input of the first comparator is connected to the output of an amplifier for amplifying the difference between the regulator output voltage and the control voltage, and that the other input of the second comparator is connected to the output of an amplifier for amplifying the supply voltage to a desired level.

3. The regulator as claimed in claim 2, wherein the amplifier connected to the other input of the second comparator, is adapted to amplify the supply voltage to the most negative output voltage to be obtained from the regulator with the the buck switch off.

* * * * *